(12) United States Patent
Tenten

(10) Patent No.: US 6,842,151 B2
(45) Date of Patent: Jan. 11, 2005

(54) APPARATUS FOR TRANSMITTING AND/OR RECEIVING DATA, TIRE FOR A MOTOR VEHICLE, TRANSMITTING AND/OR RECEIVING DEVICE AND SYSTEM FOR THE WIRELESS TRANSMISSION OF DATA

(75) Inventor: Wilfried Tenten, Gammertingen (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 10/335,559

(22) Filed: Dec. 30, 2002

(65) Prior Publication Data
US 2003/0156067 A1 Aug. 21, 2003

(30) Foreign Application Priority Data
Dec. 29, 2001 (DE) .......................................... 101 64 488

(51) Int. Cl.⁷ ................................................ H01Q 1/32
(52) U.S. Cl. ........................ 343/711; 343/713; 340/572
(58) Field of Search ................................ 343/704, 711, 343/713, 741, 742, 866, 718; 340/572

(56) References Cited

U.S. PATENT DOCUMENTS

| | | | | |
|---|---|---|---|---|
| 4,067,235 A | * | 1/1978 | Markland et al. | 73/146.5 |
| 6,005,397 A | * | 12/1999 | Zoughi et al. | 324/644 |
| 6,147,659 A | * | 11/2000 | Takahashi et al. | 343/866 |
| 6,378,360 B1 | * | 4/2002 | Bartels | 73/146.5 |
| 6,630,910 B2 | * | 10/2003 | Forster et al. | 343/806 |
| 2004/0039509 A1 | * | 2/2004 | Breed | 701/45 |

FOREIGN PATENT DOCUMENTS

DE 197 02 768 4/1998

* cited by examiner

Primary Examiner—Tho Phan
(74) Attorney, Agent, or Firm—Kenyon & Kenyon

(57) ABSTRACT

An apparatus, a tire, a transmitting and/or receiving device and a system for the wireless transmission of data are proposed, the apparatus being connected to a rotatable part, the part having a metal belt, the apparatus having an antenna device which is provided in a manner that it is able to be coupled inductively and/or capacitively to the metal belt.

22 Claims, 1 Drawing Sheet

APPARATUS FOR TRANSMITTING AND/OR RECEIVING DATA, TIRE FOR A MOTOR VEHICLE, TRANSMITTING AND/OR RECEIVING DEVICE AND SYSTEM FOR THE WIRELESS TRANSMISSION OF DATA

FIELD OF THE INVENTION

The present invention relates to an apparatus, a tire, a transmitting and/or receiving device and a system for the wireless transmission of data.

BACKGROUND INFORMATION

German Patent No. 197 02 768 describes an apparatus for the wireless transmission of at least one measured value from moving parts. Such an apparatus has the disadvantage that a transmission is only possible at specific positions of the tire. Moreover, in the related art it is necessary to carry out a multiple, bi-directional data transmission for transmitting a single measured value.

Furthermore, tire identification devices, so-called "tire TAGs", are generally known. These products use batteries in the tire electronics, so that this TAG is energized by the battery over a certain lifetime. The sensitivity of batteries to environmental influences in the tire is familiar, and becomes noticeable in a negative manner.

SUMMARY OF THE INVENTION

In contrast, the apparatus of the present invention, the tire of the present invention, the transmitting and/or receiving device of the present invention and the system of the present invention for the wireless transmission of data according to the alternative independent claims have the advantage that a wireless transmission of data is able to be carried out between a part, provided movably and particularly as a tire of a vehicle, and a vehicle, particularly a motor vehicle, to which the movable part is attached, both an energy supply of the apparatus located in the rotatable part and, moreover, a data transmission in any position of the moveable part being made possible.

Furthermore, according to the present invention, it is advantageously possible to use a steel belt as the metal belt. This advantageously permits the utilization of customary metal belts used in vehicle tires, which reduces the cost of using the apparatus according to the present invention.

In addition, it is advantageous that the part is a tire of a vehicle. It is thereby possible according to the present invention to exchange information between the tire and the vehicle.

In addition, it is advantageous that the apparatus includes a first capacitor for storing electrical energy. It is thereby possible to dispense with a battery in the movable part.

It is also advantageously possible for the apparatus to include a second capacitor and a resistor.

This makes it possible to produce an apparatus having an admittance filter.

Another advantage is that the apparatus includes a diode, particularly a varactor. It is thereby possible to transmit data of the tire in a manner that a frequency modulation of a received carrier frequency is carried out. Consequently, the power for the hop is not influenced.

DETAILED DESCRIPTION

Figure 1:
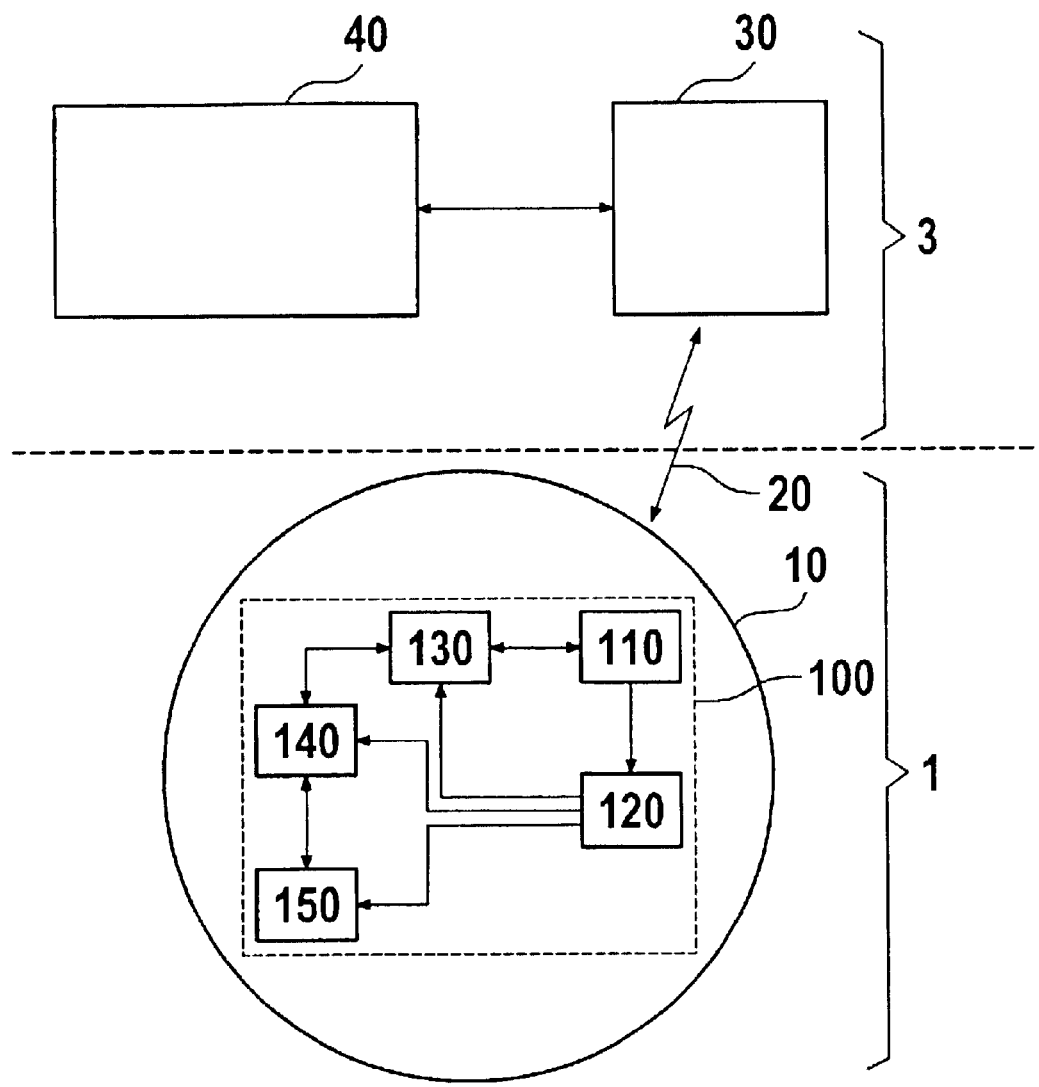
FIG. 1 shows a system of the present invention for the wireless transmission of data, having an apparatus according to the present invention and a transmitting and/or receiving device according to the present invention.

FIG. 1, in a region provided with a brace and the reference numeral 1, shows an apparatus 100 of the present invention for transmitting and/or receiving data. Apparatus 100 of the present invention is provided in the spatial proximity of metal belt 10. According to the present invention, both apparatus 100 and metal belt 10 are provided in a movable part, for which the region provided with reference numeral 1 stands in FIG. 1. Part 1, which is movable and especially rotatable, is provided in particular as tire 1 of a vehicle. According to the present invention, the vehicle is provided in particular as a motor vehicle.

Also shown in FIG. 1 is a region, depicted by a brace and provided with reference numeral 3, which represents the region of vehicle 3. Between region 1 of tire 1 and region 3 of vehicle 3, a dotted line is portrayed in FIG. 1 dividing FIG. 1 into two halves. In the region of vehicle 3 in FIG. 1, a transmitting and/or receiving device 30 and a control unit 40 are provided which are interconnected.

According to the present invention, apparatus 100 of the present invention includes an antenna device 110, an energy store 120 and a transmitting and/or receiving unit 130. Moreover, the present invention provides in particular that apparatus 100 also has a data-preparation device 140 and a sensor suite 150. Apparatus 100 of the present invention is provided in such a way that antenna device 110 is connected to energy store 120, and energy store 120 is connected to transmitting/receiving unit 130, data-preparation unit 140 and sensor suite 150, respectively. Furthermore, according to the present invention, antenna device 110 is connected to transmitting/receiving unit 130, transmitting/receiving unit 130 is connected to data-preparation unit 140, and it in turn is connected to sensor suite 150.

An essential factor for increasing safety in road traffic is the reduction of the braking distance, as well as supporting interventions in the traction control system and other systems used for driving safety. In this context, important information is data which is present only in the tire of a motor vehicle, such as the tire pressure, the tire temperature, the type of tire, the number of kilometers driven with this tire and further data.

According to the present invention, the indicated information is made available to vehicle 3 with the aid of a wireless transmission from tire 1. In this connection, it is advantageous if the energy for transmitting data from tire 1 to vehicle 3 is drawn from the direct surrounding field of apparatus 100 within tire 1.

To that end, apparatus 100 of the present invention is provided, which permits an energy supply by a hop 20 between transmitting and/or receiving device 30 and tire 1 utilizing metal belt 10 of the tire, i.e. particularly steel belt 10 of tire 1.

Moreover, the present invention provides for designing apparatus 100 in such a way that it prepares sensor information of tire 1 with the least possible energy consumption, i.e. at the lowest energy level, such that a diode, particularly a varactor, is controllable. The varactor modulates a reception oscillating circuit (not shown) in apparatus 100 in terms of frequency. This modulation is digitally demodulated on the side of transmitting and/or receiving device 30 which is linked to a small external antenna located, for example, in the wheel housing and not specifically shown. With the aid of signal-processing techniques known from digital signal processing, these low-energetic signals are extracted from the total signal, which also includes the noise background, and are able to be evaluated in transmitting and/or receiving device 30 and in control unit 40, respectively.

Tire identification devices, so-called tire TAGs, are already generally known. Such products use batteries in the tire electronics, so that the TAG is energized by the battery over a certain lifetime. The sensitivity of batteries to environmental influences in the tire is generally known, and leads to an undesirably short service life, failures and the like. According to the present invention, the electromagnetic energy of hop 20 between transmitting and/or receiving device 30 and apparatus 100 is used for the energy supply of apparatus 100 according to the present invention, which in the following is also designated as TAG 100. Here, however, it is sometimes problematic that for commercially available tires 1, steel belts are provided to increase the mechanical stability of tire 1. However, such steel belts screen the radio waves used for the data transmission between transmitting and/or receiving device 30 and apparatus 100, with the result that the use of the electromagnetic energy of the hop for the energy supply of TAG 100 is not attractive in every case. According to the present invention, however, the transmission power of the hop, which in FIG. 1 is provided with reference numeral 20, is selected to be so low that screening by metal belt 10 of tire 1 is kept as small as possible. The screening effect of metal belt 10 of tire 1 is caused in particular by the induction of eddy currents which are opposite to the vectors of the magnetic field strength of hop 20. Due to the eddy currents, a parasitic electrical field develops which assures that radio-wave field 20 reaches a small part of tire 1, i.e. of metal belt 10 at the most. Hop 20 will therefore not penetrate tire 1, but is displaced at the surface of metal belt 10, which in the following is also designated as steel belt 10, in the direction of rotation of tire 1.

According to the present invention, however, the transmission power of hop 20 between transmitting and/or receiving device 30 and apparatus 100 is selected to be small, such that the magnetic field of hop 20 penetrates steel belt 10. However, since steel belt 10 is electrically conductive, resulting from this is an influencing of the magnetic field of radio-wave field 20, so that it is bent into and around steel belt 10. This yields a distribution of the energy of radio-wave field 20 in the region of metal belt 10 of the type that radio-wave field 20 is distributed along the entire periphery of steel belt 10, and is not concentrated onto a small region opposite transmitting and/or receiving device 30.

Figure 2:
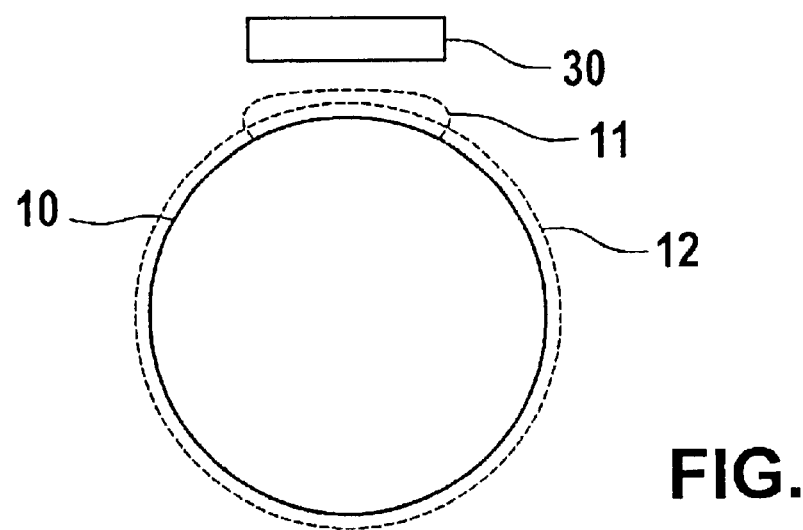
FIG. 2 shows the metal belt, the transmitting and/or receiving device and the concentration of the irradiated radio energy onto specific regions of the metal belt at different transmission powers.

This is depicted in FIG. 2, where metal belt 10 of tire 1 is shown together with transmitting and/or receiving device 30. Also shown in FIG. 2 is a first region 11 represented by a dotted line, and a second region 12 likewise represented by a dotted line. If the transmission power of transmitting and/or receiving device 30 is too high, the energy of hop 20, which is not represented by its own reference numeral in FIG. 2, concentrates in first region 11, so that no or only a very slight energy of hop 20 is present on the side of metal belt 10 of tire 2 lying diametrically opposed to transmitting and/or receiving device 30. However, if the transmission power of transmitting and/or receiving device 30 is selected to be small enough that the screening effect of eddy currents in metal belt 10 is largely avoided, then the energy of the hop is distributed according to second region 12 along the entire periphery of metal belt 10. If the hop frequency used is in a range which permits a near-field situation, then radiation into the free space and therefore disturbance of other road-users or systems is thereby additionally avoided to the greatest extent possible. In this context, the near-field condition is given in that the receive antenna of the transmission system lies within a propagation area of the diameter of the wavelength of the frequency used divided by $2*\pi$. The use of the apparatus of the present invention, the tire of the present invention, the transmitting and/or receiving device of the present invention and the system of the present invention with a frequency so that the near-field situation is honored therefore also has the advantage that a disturbance of other road-users or systems is avoided.

Therefore, according to the present invention, it is possible to use steel belt 10 as an "intermediate or auxiliary antenna". According to the present invention, the field of hop 20 diffracting around steel belt 10 is tapped with antenna device 110 on the tire electronics of TAG 100. Antenna device 110 is located according to the present invention in the immediate vicinity of steel belt 10, and particularly on the inner side of the tire. In the present invention, antenna device 110 is coupled especially in a capacitive and/or inductive manner to steel belt 10 of tire 1. According to the present invention, the energy received by antenna device 110 is stored in particular in a capacitor assemblage. Therefore, in the present invention, energy store 120 provided according to the present invention is provided in particular as capacitor assemblage 120. In this context, capacitor assemblage 120 includes in particular a first capacitor (not shown) having a high storage capability and a second capacitor (likewise not shown) having especially a smaller capacitance. For example, the second capacitor is provided in a hybrid type of construction directly on an electronics carrier, i.e., for instance, a printed circuit board or the like, of TAG 100. The first capacitor having the higher storage capability is provided according to the present invention as a foil, for example, on the inner side of the tire. The two capacitors, which are not represented by a reference numeral in the Figures, according to the present invention are separated from each other via a resistor, and thereby form an admittance filter having on one hand an energy-storing, and on the other hand, a voltage-smoothing effect.

According to the present invention, tire data such as tire pressure and tire temperature, which is ascertained and made available by sensors and by residual-amount storage devices, respectively, is fed, particularly in terms of voltage, to a diode, especially a varactor. The diode is likewise not represented in the Figures by a reference numeral. Such a diode has the characteristic that the diode capacitance is dependent upon the voltage applied. In the present invention, such a diode is used for the frequency modulation of the received carrier frequency of hop 20. The power for the hop is hereby not influenced, resulting in the avoidance of eddy currents due to backward-acting induction of the circuital vector field. The signal modulated in such a manner is routed from transmitting/receiving unit 130 to antenna device 110 of apparatus 100, and transmitted to transmitting and/or receiving device 30 with the aid of hop 20. In the receiving electronics of transmitting and/or receiving device 30, the signal modulated by apparatus 100 is coupled out capacitively from the transmit oscillating circuit and demodulated, preferably digitally, for example, by a coordinate rotation method (CORDIC). The signal thus digitalized is prepared in a signal processor unit in such a way that the modulated information becomes utilizable. The signal processor unit is provided, for example, in transmitting and/or receiving device 30 or also in control unit 40.

When a user of vehicle 3 activates vehicle 3, especially by turning the ignition key, then initially, for example, static information is read out from tire 1, transmitted into transmitting and/or receiving device 30 and control unit 40, respectively, and managed. Dynamic data, i.e. data corresponding to the instantaneous tire pressure and instantaneous tire temperature, is subsequently read out and processed. When a user of vehicle 3 deactivates vehicle 3, particularly by removing the ignition key, then a follower control provides for storing the data, ascertained during the trip, in apparatus 100 in tire 1. The energy for this purpose is stored in capacitor assemblage 120, i.e., energy store 120. According to the present invention, provision is made in apparatus 100 for a data memory which is non-volatile and which stores changeable data such as the mileage driven with this tire. However, such a data memory is not shown specifically in FIG. 1 for apparatus 100.

According to the present invention, it is also determined in transmitting and/or receiving device 30 or in control unit 40 whether a stationary wave of hop 20 has developed on steel belt 10. This is recognized by detecting an amplitude maximum which sets in at resonance. A stationary wave prevents reception for apparatus 100 when it is in the zero point area. For this reason, the present invention proposes avoiding the resonance condition, and in terms of frequency, to operate somewhat distant from the resonant frequency. The resonant frequency may be ascertained from the tire data, for the tire circumference is stored and is known to the electronics of control unit 40 and of transmitting and/or receiving device 30, respectively, so that an adapted useful frequency therefrom is already used at the system start, and possibly only a fine adjustment is to be done. A control which evaluates the received voltage and is able to track the transmitting frequency, i.e., the carrier of hop 20, helps with this task.

Various sensor modules, which are located in apparatus 100 within sensor-suite unit 150, are activated by a signal identifier with the aid of a field effect. Therefore, only the energy is bundled which is needed for this time for the task at hand. During this time, all other modules of sensor-suite unit 150 are held in the so-called "weak inversion operation", which operates nearly without current. The energy consumption in this operation is less than approximately 1 pVA.

Therefore, according to the present invention, apparatus 100 is provided in such a way that the supply voltage for apparatus 100 is drawn from the hop energy of hop 20, apparatus 100 operates independently of speed, and the data transmission in particular is analog, which means it is possible to avoid a clocking that needs further energy. According to the present invention, only that module, especially sensor module, of sensor-suite unit 150 is activated whose data is called for by transmitting and/or receiving device 30. Data storage at the end of operation is ensured by energy store 120, and apparatus 100 is also provided in a programmable manner.

Data is transmitted from apparatus 100 to control unit 40 via a data preparation operating in a nearly wattless manner, so that both fixed tire characteristics, e.g. the manufacturing date, the tire size, the tire brand and the like, as well as dynamic data, e.g. the tire pressure, the tire temperature and the like, are transmitted over the same data link. The data may be transmitted both in "plaintext", as well as coded and/or compressed.

The present invention also provides for the use of an alarm device for the priority control. This ensures that if a catastrophic event happens, such as a sudden pressure loss, a rapid temperature increase exceeding the critical temperature or the like, the driver is informed immediately. In particular, according to the present invention, this alarm does not require an exact communication of a datum, but rather only the transmission of a flag which identifies the specific alarm state.

Moreover, according to the present invention, besides antenna device 110, an additional antenna, not shown in FIG. 1, is mounted in the inside tread of the tire. It may be installed both in front of and behind steel belt 10. This additional antenna has the advantage that the incident energy of hop 20 is collected and passed on to antenna device 110. Influence of the rim of tire 1, such as a steel rim or aluminum rim, on the electromagnetic field is thereby greatly reduced. The additional antenna likewise permits a speed-independent method of operation, and moreover, provides for an improved energy input into apparatus 100 and for a more interference-free reception. Reception problems which are caused, for example, by a torn steel belt 10, may also be avoided in this manner. Due to this flexible type of design, the formation of the internal antenna may be optimally adapted to the specific tire construction.

According to the present invention, the additional antenna is provided in particular as a wire. This wire may be made available on the basis of the construction technique of the tire. According to the present invention, this yields the following advantages. A defined antenna length in the vicinity of a tenth to an eighth of the wavelength is possible. Furthermore, an antenna is also present when no steel belt 10 is present or when steel belt 10 is defective. According to the present invention, by providing an additional antenna in the form of a wire, an optimized antenna form is possible. In the same way, by the use of a wire as additional antenna, the speed-independence is advantageously ensured. In particular, according to the present invention, the additional antenna in the form of a wire is also provided outside of steel belt 10 on the side of the tread of tire 1. The aforesaid advantages of an additional antenna provided as a wire are thereby yielded, and moreover, also the advantage that such an additional antenna is independent of magnetic properties of the steel belt and the rim material to the greatest extent possible.

What is claimed is:

1. An apparatus for at least one of transmitting and receiving data, the apparatus being connected to a rotatable part having a metal belt, the apparatus comprising:

an antenna device that is able to be coupled at least one of inductively and capacitively to the metal belt;

wherein the apparatus permits an energy supply by a hop between the apparatus and the metal belt, and a transmission power of the hop is low.

2. The apparatus as recited in claim 1, wherein:

the metal belt includes a steel belt.

3. The apparatus as recited in claim 1, wherein:

the rotatable part includes a tire of a vehicle.

4. The apparatus as recited in claim 1, further comprising:

a first capacitor for storing electrical energy.

5. The apparatus as recited in claim 4, further comprising:

a second capacitor; and a resistor.

6. The apparatus as recited in claim 1, further comprising:

a diode.

7. The apparatus as recited in claim 6, wherein:

the diode includes a varactor.

8. A tire for a vehicle, comprising:

an apparatus for at least one of transmitting and receiving data, the apparatus being connected to a rotatable part having a metal belt and the apparatus including an antenna device that is able to be coupled at least one of inductively and capacitively to the metal belt;

wherein the apparatus permits an energy supply by a hop between the apparatus and the metal belt, and a transmission power of the hop is low.

9. A device for at least one of transmitting and receiving, comprising:

an arrangement for cooperating with an apparatus for at least one of transmitting and receiving data, the apparatus being connected to a rotatable part having a metal belt and the apparatus including an antenna device that is able to be coupled at least one of inductively and capacitively to the metal belt;

wherein the apparatus permits an energy supply by a hop between the apparatus and the metal belt, and a transmission power of the hop is.

10. A system, comprising:

an arrangement for providing a wireless transmission of data between an apparatus and a device for at least one of transmitting and receiving device, the apparatus being for at least one of transmitting and receiving data, the apparatus being connected to a rotatable part having a metal belt and the apparatus including an antenna device that is able to be coupled at least one of inductively and capacitively to the metal belt;

wherein the apparatus permits an energy supply by a hop between the apparatus and the metal belt, and a transmission power of the hop is low.

11. The apparatus as recited in claim 1, further comprising:

a data-preparation unit.

12. The apparatus as recited in claim 1, further comprising:

a sensor arrangement.

13. The apparatus as recited in claim 1, further comprising:

a transmitting/receiving unit.

14. The apparatus as recited in claim 1, wherein:

a magnetic field of the hop penetrates the metal belt.

15. The apparatus as recited in claim 1, wherein:

the metal belt includes one of an intermediate antenna and an auxiliary antenna.

16. The apparatus as recited in claim 1, wherein:

the rotatable part includes a second antenna arranged adjacent to the metal belt.

17. The apparatus as recited in claim 16, wherein:

the second antenna includes a wire.

18. The apparatus as recited in claim 1, wherein:

energy for data transmission is drawn from a direct surrounding field of the apparatus.

19. The apparatus as recited in claim 1, wherein:

the transmission power of the hop is low so that a screening of radio waves by the metal belt is small.

20. The tire as recited in claim 8, wherein:

the transmission power of the hop is low so that a screening of radio waves by the metal belt is small.

21. The device as recited in claim 9, wherein:

the transmission power of the hop is low so that a screening of radio waves by the metal belt is small.

22. The system as recited in claim 10, wherein:

the transmission power of the hop is low so that a screening of radio waves by the metal belt is small.

* * * * *

UNITED STATES PATENT AND TRADEMARK OFFICE
CERTIFICATE OF CORRECTION

PATENT NO.   : 6,842,151 B2
DATED        : January 11, 2005
INVENTOR(S)  : Wilfried Tenten It is certified that error appears in the above-identified patent and that said Letters Patent is hereby corrected as shown below:

Column 7,
Line 24, change "power of the hop is" to -- power of the hop is low --
Line 28, change "transmitting and receiving device." to -- transmitting and receiving data --

Signed and Sealed this

Nineteenth Day of July, 2005

JON W. DUDAS
*Director of the United States Patent and Trademark Office*